Aug. 5, 1958 W. R. CONKLIN ET AL 2,845,780
FOOD SERVICE CART
Filed Jan. 17, 1956 3 Sheets-Sheet 1
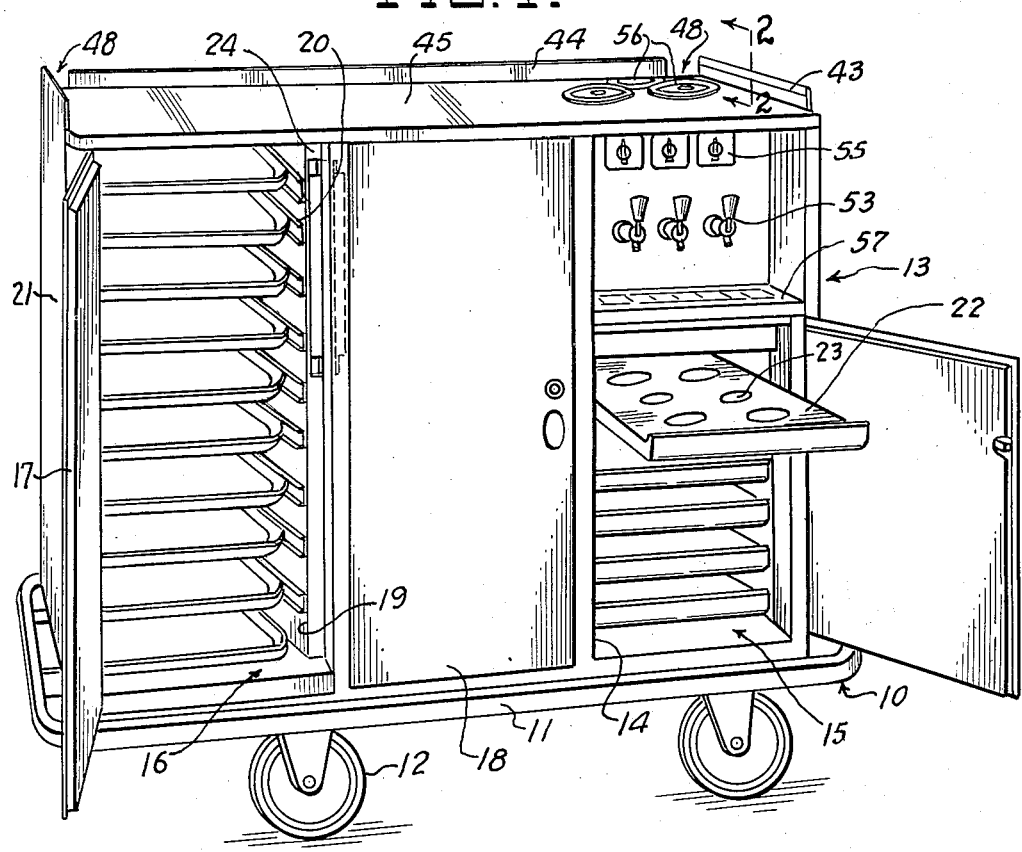
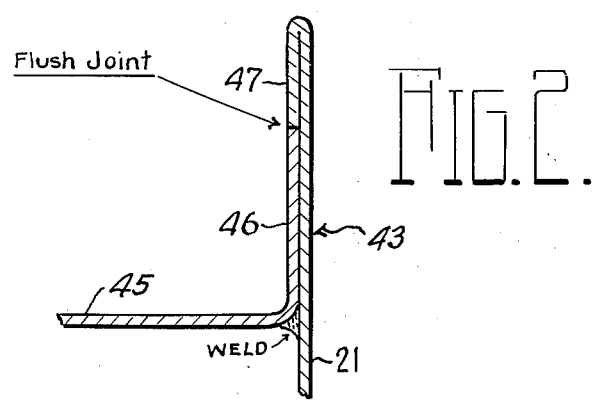
INVENTOR.
William R. Conklin
Douglas G. Thom
BY Blair E. Stentz
Owen + Owen
ATTORNEYS Aug. 5, 1958 W. R. CONKLIN ET AL 2,845,780
FOOD SERVICE CART
Filed Jan. 17, 1956 3 Sheets-Sheet 2
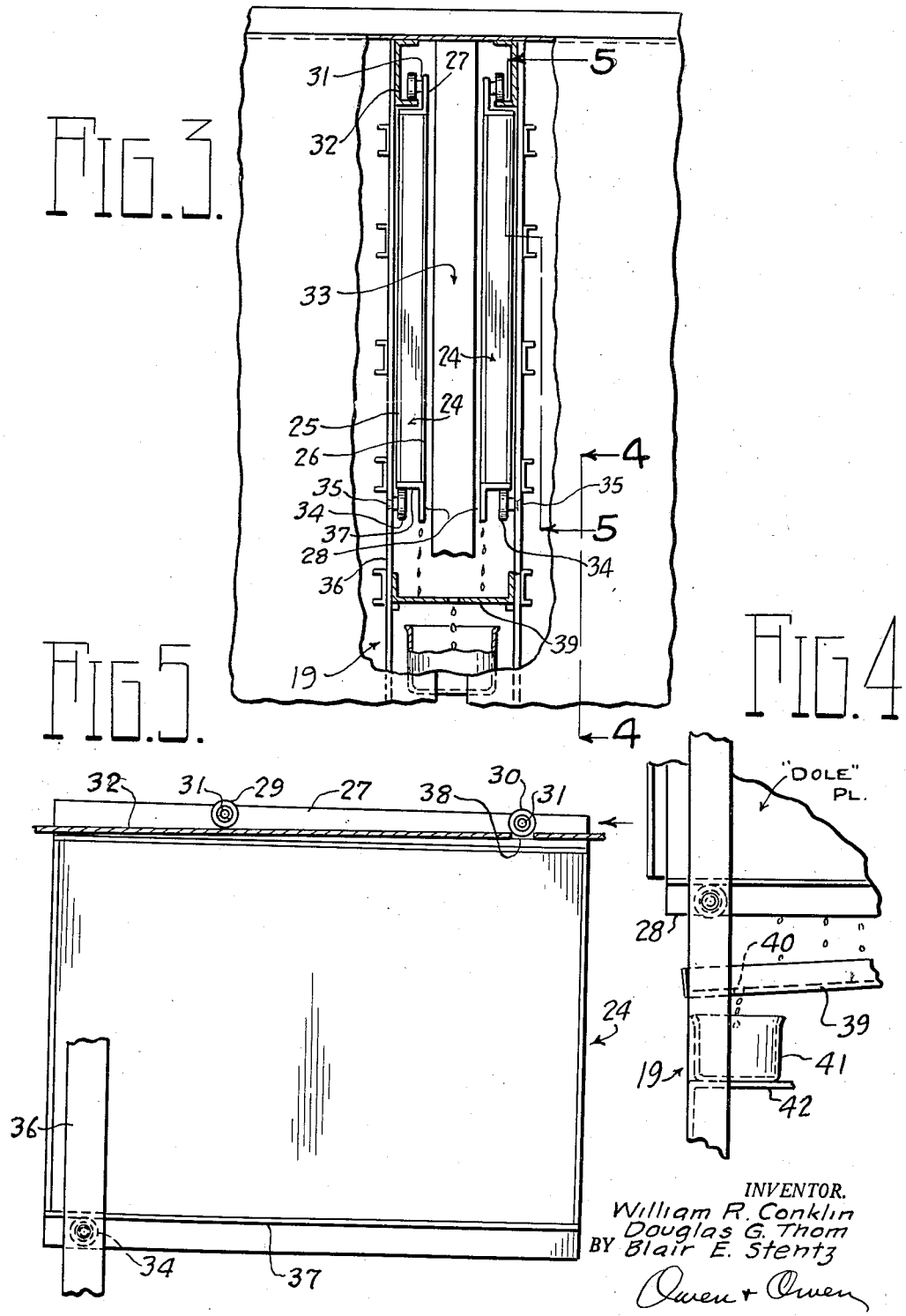
INVENTOR.
William R. Conklin
Douglas G. Thom
BY Blair E. Stentz
Owen + Owen
ATTORNEYS

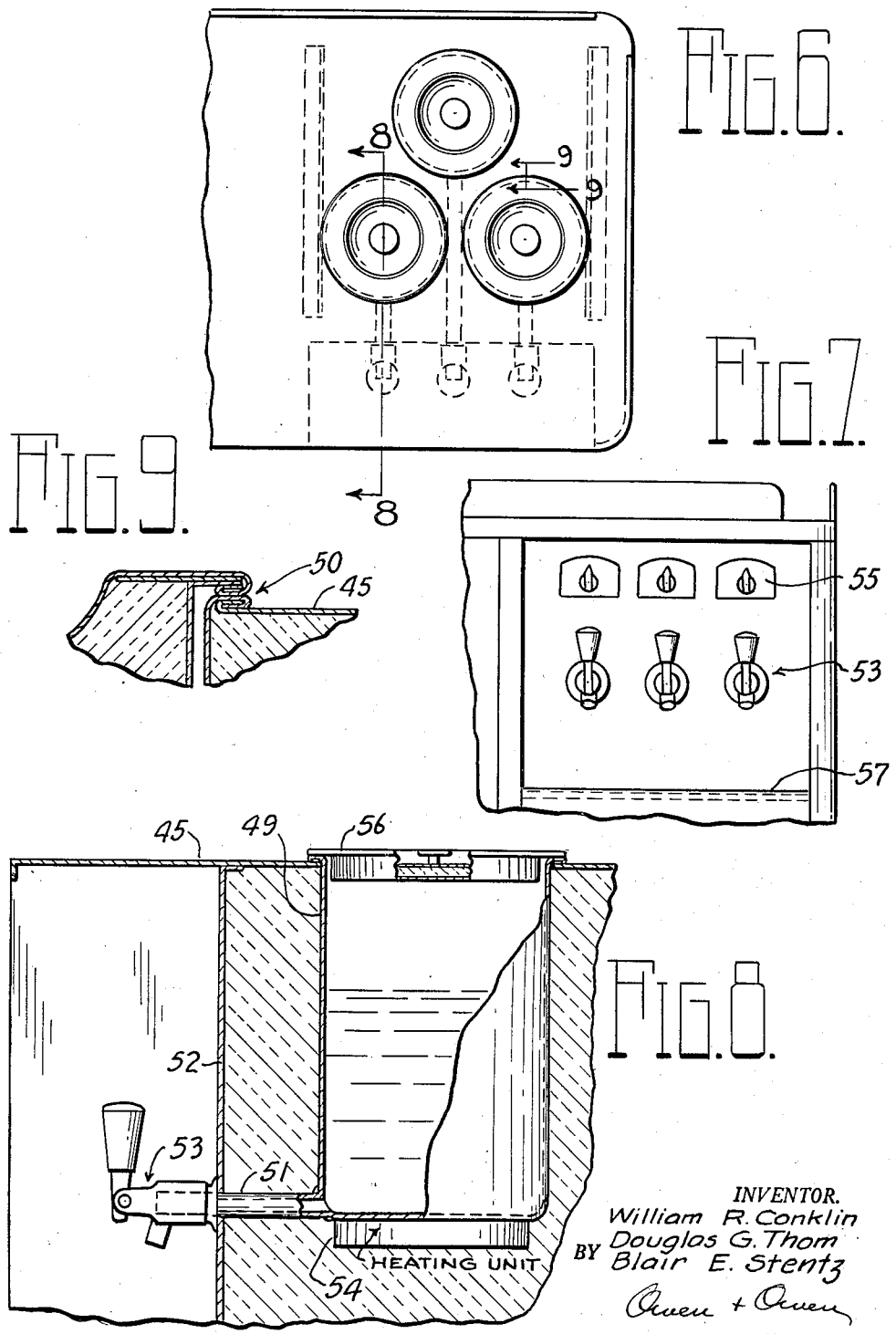

United States Patent Office 2,845,780
Patented Aug. 5, 1958

2,845,780

FOOD SERVICE CART

William R. Conklin, Douglas G. Thom, and Blair E. Stentz, Murfreesboro, Tenn., assignors to The Swartzbaugh Manufacturing Company, Murfreesboro, Tenn., a corporation of Ohio Application January 17, 1956, Serial No. 559,583

6 Claims. (Cl. 62—291)

This invention relates to food service carts and more particularly to improvements in a portable food service cart designed to convey foods to locations remote from the food preparation center, such as patients' trays to corridors in hospitals.

Carts of this type usually are provided with hot and cold compartments so that the food may be arranged on individual trays with all of the utensils, service items and cold foods such as salads, bread and butter, desserts, etc., on each individual tray and with the hot items in a separate insulated compartment. It is also usual to provide means for heating the hot food compartment, say, by electricity, so that the cart may be positioned in a hall outside a group of rooms and the food maintained hot as each patient's tray is made up and delivered to him.

The cold compartments of the food cart frequently are kept cold by inserting chill plates, one make of which is known as a "Dole" plate. These chill plates are rectangular containers filled with a fluid having a relatively low freezing point and high specific heat so, once chilled, they remain cold for a long period of time in order to chill the compartment and the trays of food contained therein. It has been customary to insert a "Dole" plate horizontally into the chill compartment in the conventional tray guides which usually are used for supporting the edges of a food tray. If the chill plate or plates are placed in the upper part of the compartment, in order to induce convection currents, the moisture from the food which condenses on the cold surface of the chill plate drips into the food on the trays beneath the plate. If the chill plate is inserted at the bottom of the compartment in order to eliminate the dripping of condensate onto any of the food trays, the plate chills only the lower portion of the compartment and does not maintain the food in the trays near the top of the compartment in good condition.

It is, therefore, an object of this invention to provide a food cart in which the chill plates may be so inserted as to provide for the collection and easy disposal of any condensate from their surfaces and to induce convection currents within the cool compartment to insure that the entire compartment is chilled.

It is another object of this invention to provide simplified and improved beverage containing portions of a food cart whereby several different beverages may be conveyed in bulk to the area of final distribution and quickly and easily be filled into cups or glasses.

It is yet another object of this invention to provide a food cart having improved construction details which facilitate maintaining it in sanitary condition and which simplify its construction and increase its strength.

These and other objects and advantages of a food cart embodying the invention will be better understood from the specification which follows and from the drawings in which:

Fig. 1 is a front view in perspective of a food cart embodying the invention;

Fig. 2 is a fragmentary, greatly enlarged, vertical, sectional view taken along the line 2—2 of Fig. 1;

Fig. 3 is a fragmentary, enlarged view, with parts broken away, of a portion of the food cart shown in Fig. 1 and illustrating, in particular, the mounting means and condensate accumulating means for the chill plates;

Fig. 4 is a fragmentary, vertical, sectional view taken along the line 4—4 of Fig. 3;

Fig. 5 is a fragmentary vertical, sectional view taken from the position indicated by the line 5—5 of Fig. 3;

Fig. 6 is a fragmentary, plan view of one end of the conveyor illustrated in Fig. 1 and showing, in particular, the beverage containing means;

Fig. 7 is a fragmentary, front view of the portion of the food cart shown in Fig. 6;

Fig. 8 is a fragmentary, vertical, sectional view on an enlarged scale taken along the line 8—8 of Fig. 6;

Fig. 9 is a still further enlarged, fragmentary, sectional view taken along the line 9—9 of Fig. 6.

A food cart embodying the invention comprises, among other parts, a main frame generaly indicated at 10 which may be provided with a cushioning bumper 11 and is supported upon four or more large diameter, caster wheels 12. The frame 10 mounts a body generally indicated at 13 which is divided by a main insulated partition 14 into a heated compartment generally indicated at 15 and a cold compartment generally indicated at 16. In the embodiment of the invention shown in the drawings the cold compartment 16 has two vertical doors 17 and 18 and a centrally located, vertical, skeleton support 19 for a plurality of individual tray guides 20. Similar tray guides 20 are secured to one of the end walls 21 of the body 13 and to the cold side of the main partition 14.

The heated compartment 15 is equipped with sliding support trays 22 at least some of which may have wells 23 for the reception of dishes of food which are to be kept hot. The heated compartment 15 usually is insulated and provided with electrical heating means (not shown) which can be connected at the distribution points to keep the dishes hot while the trays are being arranged.

According to the invention, the cold compartment 16 is kept cool by two or more chill plates, commonly called "Dole" plates, 24, which are shown in detail in Figs. 3, 4 and 5. Each of the chill plates 24 has a rectangular body formed from a front 25 and back 26 (Fig. 3) with closed ends so that the hollow rectangular body can contain a quantity of a suitable fluid having a low melting point and a high specific heat. In the form of chill plates utilized in a cart according to the invention, the back 25 has a top flange 27 and a bottom flange 28 which extend in the plane of the back 26 above and below he body of the chill plate 24. A pair of support rollers 29 and 30 are rotatably mounted upon short studs 31 riveted or otherwise secured in the upper flange 27. The rollers 29 and 30 run on a U-track 32 welded, riveted or otherwise secured in the skeleton partition frame 19 near the top of the compartment 16. As can best be seen in Figs. 4 and 5, there are two of the tracks 32 oppositely directed and at opposite sides of the skeleton partition 19 so that two "Dole" plates 24 can be hung in the skeleton frame 19 between the two halves of the cold compartment 16 to which access is given by the doors 17 and 18. A space generally indicated at 33 is left between the two chill plates 24 and opens at the top through the webs of the tracks 32 and the skeleton frame 19 into the two halves of the cold compartment 16.

A single roller 34 is rotatably mounted upon a short stud 35 that is riveted or otherwise secured in a front upright 36 of the skeleton frame 19 at such a distance that it is engageable with the bottom horizontal edge 37 of the chill plate 24. A notch 38 is cut in the bottom arm of the track 32 near its rear and the roller 30, as shown in Fig. 5, drops into the notch 38 when the chill plate 24 is fully inserted in place in the skeleton frame 19. When it is desired to remove the chill plate 24 its front edge can be grasped between the fingers and a slight forward pull rolls the rear roller 30 up out of the notch 38 and onto the horizontal arm of the track 32. The chill plate 24 can be rolled along forwardly on the track 32 and when the front roller 29 drops off the front end of the track 32 the plate 24 then rolls on the bottom roller 34 and the rear roller 30 until it is removed from the cart.

With the two chill plates 24 positioned vertically and spaced from each other, any moisture which condenses on their surfaces runs down to their bottom flanges 28 and then drips down into an inclined trough 39 which is removably positionable in the skeleton frame 19 and which has a drain opening 40 near its front end positioned above a cup 41 resting on a support bracket 42 in the skeleton frame 19. Condensate from the chill plates 24 is thus prevented from running either onto trays of food or on the bottom of the cold compartment 16. The cup 41 may be removed at will to empty the condensate.

By positioning the two chill plates 24 near the top of the cold compartment 16 and by spacing them from each other, a vertical "chimney" effect is induced by the convection currents within the cold compartment 16 and through the space 33 between the chill plates 24. This insures that all of the air in the cold compartment 16 circulates and effects general cooling of the entire compartment rather than merely the area immediately adjacent the chill plates.

Fig. 2 illustrates an improvement in the fabrication of raised lips 43 at the ends of the body 13 and 44 at the rear of the body 13 along the edges of its top 45. In a food service cart of the type generally disclosed in the drawings, it is necessary that the top 45 have edges to prevent objects placed thereon from being inadvertently knocked off. It is essential however that the top should be easy to clean and that no crevices for the accumulation of liquids or foods should be present. The edges 43 and 44 shown in the drawings eliminate any crevice between the top 45 and the edges 43 and 44 by reason of the manner of their construction. The edges are formed by bending up the material of the top 45 to form a top flange 46 and then by running the end plates 21 up beyond the top 45 and folding it over sharply to form an upper edge flange 47 which is butt-jointed to the top edge flange 46 in a flush joint. The corner between the underside of the top 45 and the inner surface of the end 21 may be welded to provide rigidity for the structure. By raising the level of the flush joint between the material from which the ends 21 and top 45 are made to the point shown in the drawings, ingress of food particles into the joint is positively eliminated. From an appearance standpoint the flush joint is virtually invisible and the smooth exterior provided by continuing the end plates 21 as the outer elements of the edges 43 and 44 also is desirable. Corners of the top as at 48 are cut out in order to further facilitate cleaning.

It is not desirable to transport beverages in individual containers because the beverages more than likely will spill from the containers as the cart is stopped and started. In a cart embodying the invention a plurality of individual liquid wells 49 are recessed into the top 45 with crimped over edges as at 50 to seal the wells 49 to the top 45. Each of the wells 49 is provided with a drain pipe 51 extending forwardly from its bottom through a vertical partition 52 and onto a discharge valve generally indicated at 53. Each of the wells 49 may be provided with an individual heating unit 54 controlled by its own thermostatic control 55 or, if a cold liquid is to be conveyed, the heating unit need not be energized.

The wells are surrounded by heat insulation material and each is provided with an insulated lid generally indicated at 56. The three valves 53 are aligned above a grilled drain sump generally indicated at 57 for catching any drippings of liquid which may fall from the valves 53.

A cart embodying the invention is thus equipped with apparatus by which both hot and cold foods may be transported to and maintained in good condition at food service locations and in which hot and cold liquids may be transported in insulated containers without danger of spillage or loss and may be transferred to individual containers such as cups and glasses with facility.

We claim:

1. In a food service cart having a cold compartment with two sets of vertically spaced pairs of horizontal tray guides, the improvement comprising a vertical frame centrally located in said compartment and mounting the inner ones of the tray guides in said two sets of tray guides, a generally rectangular chill plate, means mounted between said sets of tray guides and near the top of said compartment and cooperating means on said chill plate for removably mounting said chill plate in vertical position between said sets of tray guides.

2. A food service cart according to claim 1 and a generally horizontal condensate drip pan removably positioned in said frame beneath said chill plate.

3. In a food service cart having a cold compartment with two horizontally spaced sets of vertically spaced, horizontal tray guides, the improvement comprising a vertical chill plate mounting frame in the center of said compartment and mounting the inner ones of the tray guides in both sets of tray guides, a rectilinear chill plate, at least one horizontal track in said frame between said sets of tray guides and near the top of said frame, at least two rollers at the upper edge of said chill plate and removably engageable on said track, and means for removably retaining said plate on said track in fully inserted position.

4. A food service cart according to claim 3 and a roller mounted in said frame near the front and engageable with the lower edge of said chill plate for rollingly supporting said plate as it is withdrawn from said frame and said compartment.

5. A food service cart according to claim 4 in which there is a pair of laterally spaced chill plate tracks for supporting a pair of chill plates in spaced, vertical parallel relationship.

6. A food service cart according to claim 4 and a condensate drip tray mounted in said frame beneath the position occupied by said chill plate.

References Cited in the file of this patent

UNITED STATES PATENTS

| | | |
|---|---|---|
| 1,511,452 | Folger | Oct. 14, 1924 |
| 1,901,509 | Hall | Mar. 14, 1933 |